(12) United States Patent (10) Patent No.: US 8,406,586 B2
Morton et al. (45) Date of Patent: Mar. 26, 2013

(54) TUNABLE OPTICAL GROUP DELAY

(75) Inventors: Paul A. Morton, West Friendship, MD (US); Jacob Khurgin, Baltimore, MD (US)

(73) Assignee: Morton Photonics Inc., West Friendship, MD (US)

( * ) Notice: Subject to any disclaimer, the term of this patent is extended or adjusted under 35 U.S.C. 154(b) by 409 days.

(21) Appl. No.: 12/897,219

(22) Filed: Oct. 4, 2010

(65) Prior Publication Data

US 2011/0019955 A1 Jan. 27, 2011

Related U.S. Application Data

(63) Continuation-in-part of application No. 12/205,368, filed on Sep. 5, 2008, now Pat. No. 7,831,119.

(51) Int. Cl.
*G02B 6/26* (2006.01)
*G02B 6/42* (2006.01)

(52) U.S. Cl. ............................................. 385/27; 385/32

(58) Field of Classification Search .................... 385/27, 385/32
See application file for complete search history.

(56) References Cited

U.S. PATENT DOCUMENTS

| | | | | |
|---|---|---|---|---|
| 6,289,151 | B1 * | 9/2001 | Kazarinov et al. | 385/32 |
| 6,297,715 | B1 * | 10/2001 | Fiedziuszko et al. | 333/209 |
| 2005/0117842 | A1 * | 6/2005 | Takahashi et al. | 385/27 |
| 2008/0112667 | A1 * | 5/2008 | Hamann et al. | 385/24 |

\* cited by examiner

*Primary Examiner* — Uyen Chau N Le
*Assistant Examiner* — Chris Chu
(74) *Attorney, Agent, or Firm* — Nadya Reingand

(57) ABSTRACT

This invention provides a balanced thermal approach to the tuning of an optical time delay device in order to eliminate any long-term time response of the device performance due to thermal time constants of the device, its mount, packaging or electronic temperature control circuits. The invention provides multiple ways to improve the thermal tuning speed of the balanced thermal approach. Additionally, the invention overcomes an issue of microresonator non-uniformity by operating a large group of microresonators as a 'super-ring' by tuning the large group together to provide a controllable group delay with large bandwidth.

20 Claims, 9 Drawing Sheets

TUNABLE OPTICAL GROUP DELAY

CROSS-REFERENCE TO RELATED APPLICATIONS

The application is a continuation-in-part of U.S. patent application Ser. No. 12/205,368 filed Sep. 5, 2008 now U.S. Pat. No. 7,831,119.

STATEMENT REGARDING FEDERAL SPONSORED RESEARCH AND DEVELOPMENT

This invention was made with U.S. Government support under Contract W31P4Q-07-C0150 with DARPA MTO SBIR Project, and the U.S. Government has certain rights in the invention.

FIELD OF INVENTION

This invention relates to an active array antenna system for use in wireless communications. More particularly it addresses tunable delays to control phased array antennas.

BACKGROUND OF THE INVENTION

A phased array is a group of radio frequency antennas in which the relative phases of the respective signals feeding the antennas are varied in such a way that the effective radiation pattern of the array is reinforced in a desired direction and suppressed in undesired directions. In typical embodiments, they incorporate electronic phase shifters that provide a differential delay or phase shift to adjacent radiating elements to tilt the radiated phase front and thereby produce far-field beams in different directions depending on the differential phase shifts applied to the individual elements.

A number of embodiments of delay lines and antenna elements can be arranged in an RF antenna assembly. The antenna assembly may include an array of the antenna elements. Such arrays of the antenna elements may, in certain embodiments, be spatially arranged in either non-uniform or uniform pattern to provide the desired antenna assembly characteristics. The configuration of the arrays of the antenna elements may affect the shape, strength, operation, and other characteristics of the waveform received or transmitted by the antenna assembly.

The antenna elements may be configured to either generate or receive RF signal. The physical structure of the element for signal generation and reception is similar, and typically a single element is used for both functions. A phase shifter/true time delay (PS/TTD) device is a crucial part of the antenna element providing a differential delay or phase shift to adjacent elements to tilt the radiated/received phase front.

The active phased array antenna architecture is the most applicable to the use of the PS/TTD device. A schematic of one of the embodiments of an active phased array antenna unit is shown in FIG. 1. The antenna element is connected to a circulator, which is used to separate the high power transmit path and the low power receive path, providing the required isolation. The receive path includes a limiter to avoid damage from a high input level, followed by a low noise amplifier (LNA) used to bring the received signal up to the required power level. The output of the LNA passes through a transmit/receive switch, and then through the phase shifter/true time delay (PS/TTD) device, which provides the correct phasing for that element before the output is summed with that from all other elements. The PS/TTD provides the correct phase shifting of each antenna element at all frequencies. The overall phased array antenna output power is a coherent addition of the signals from each of the antenna elements. A large number of elements provide a large total power for the system.

The tunable delay application is not limited to active phased array antennas. Alternatively, PS/TTDs can be implemented in passive phased array systems, where the power is shared passively between many antenna elements, each having its own PS/TTD device.

Photonics technologies offer significant advantages over RF and microwave electronics, which can be exploited in phased array systems. Optics offer tremendous inherent bandwidth for use in optical processing and communicating systems, due to the very high carrier frequencies (e.g. 200 THz) compared to the microwave signals (10 s GHz) upon which they operate. Photonic technologies offer much lower cost if efficiently integrated. Photonic devices are inherently small due to the short wavelength at which they operate (around 1 micron) compared to the cm and mm wavelengths of microwave integrated circuits in phased array systems. Photonic integration provides a path to massive parallelism, providing additional reductions in size and weight, together with the promise of much lower overall system cost.

This invention relates to optical delay lines based on microresonator structures. One of the most promising delay line designs is a 'side-coupled integrated spaced sequence of resonators' (SCISSOR) shown in FIG. 2 (a). SCISSOR structures are by definition all-pass filters with light propagating in only one direction, and thus they have zero reflection. U.S. Pat. No. 7,058,258 discloses an implementation of the side—coupled sequence of resonators for tunable dispersion compensation. It provides different group delays at different frequencies of the optical signal. The present invention addresses an opposite goal—to achieve exactly the same group delay over as wide range of frequencies as possible.

Another configuration (FIG. 2 (b)) of the side-coupled sequence of resonators was presented in U.S. Pat. No. 7,162,120, where the resonators are coupled to the opposite sides of the core waveguide. This configuration was designed only for the device compactness; there is no difference between the resonators on the both sides of the waveguide.

A multitude of phased array systems are used in many applications, varying from large surveillance systems to weapons guidance systems to guided missiles, plus many civil applications including weather monitoring radar systems, radio-astronomy and topography.

There is a need to provide more reliable and efficient devices for tunable delays to control phased array antennas. The best approach is in implementation of an optical device to provide extended bandwidth, cost reduction and compactness. As it was shown in our prior invention described in U.S. patent application Ser. No. 12/205,368, the tenability may be achieved either by the thermo-optical effect or by the quantum confined Stark effect or by carrier injection.

One of the key issues with using thermal tuning of a device, is that there are usually multiple time constants involved in the tuning, i.e. although the goal is to achieve fast (e.g. microsecond) tuning times, which may be achieved by the device structure itself, when it is done thermally there are typically much longer time constants also involved, due to the thermal mass of the whole device, the submount, the heatsink it is placed on, the cooling circuit that keeps the temperature constant etc. These much slower time constants, which can be as long as many seconds, cause changes in the device output on these longer timescales, which reduces the device performance, and in some applications makes the performance unacceptable.

There is a need to provide an improved tuning mechanism to achieve faster and more reliable performance.

A key issue with current manufacturing of microresonators is the lack of uniformity of microresonator response, in particular the lack of uniformity of microresonator resonance frequency for identically designed microresonators on the same device. An example of this non-uniformity is shown in FIG. 2 (c), which is the measured transmission spectrum for a device with 10 identical microresonators on it. Each individual microresonator has a resonance dip close to 1555 nm, with a width of ~0.3 nm and a free-spectral range of ~9.5 nm. The combination of the 10 microresonator responses is a broad dip with a width of ~1.2 nm, 4× the width of an individual microresonator dip, with visible signs of individual microresonator dips. In order to use this device in a tunable delay such as the current invention, there is a need for each of the microresonators to be aligned with each other, at least for the zero detuning setting of the delay. Because of the resonance frequency non-uniformity, this requires individual control of each of the microresonators, plus a measurement of each microresonator to find its resonance frequency relative to the design, so that the microresonator can be tuned to the design frequency. This adds significant complication to the use of this device in a practical application.

There is a need to provide a tunable delay with a broader bandwidth in order to support optical signals with broader bandwidth.

SUMMARY OF INVENTION

This invention provides a tunable delay comprising at least a first and a second integrated microresonators having angular resonant frequencies $\omega_1=\omega_0-\Delta\omega$ and $\omega_2=\omega_0+\Delta\omega$ respectively, $\omega_0$ is a median frequency of an input optical signal and $\Delta\omega$ is a deviation from the median frequency. The resonators are coupled to a waveguide. In one embodiment the resonators are ring resonators having a radius ranging from about 2 μm to about 50 μm.

In the preferred embodiment an input signal is a complex signal having multiple frequency components, and the device is providing an equal group delay to all frequency components in the output signal. Such arrangement allows eliminating a third order group delay dispersion over all frequencies of the input optical signal; this is achieved using cancellation of a positive dispersion of the first loop resonator by a negative dispersion of equal magnitude of the second loop resonator.

The optical device of the present invention may provide a group delay up to 1000 ps. In order to achieve such delay the optical device includes more than one pair of microresonators with $\omega_1$ and $\omega_2$ frequencies; in the preferred embodiment the optical device has two sets of resonators, each set having at least 20 resonators. The first set has the angular resonant frequencies $\omega_1$ and the second $-\omega_2$. In one configuration resonators with $\omega_1$ and $\omega_2$ are interleaved and positioned on the opposite sides of the waveguide.

In the preferred embodiment the angular resonant frequencies are tunable. The tenability is achieved either by thermo-optical effect or by quantum confined Stark effect or by carrier injection. The resonant angular frequencies $\omega_1$ and $\omega_2$ may be tunable within a range of +/−0.1% within 10 microseconds. In one embodiment the resonant angular frequencies $\omega_1$ and $\omega_2$ are tunable slowly using thermo-optical effect followed by a fast tuning using carrier injection or Stark effect.

In the preferred embodiment a balanced thermal tuning is applied, which includes simultaneous thermal tuning up and down the $\omega_1$ and $\omega_2$ resonators respectively. In order to increase the tuning speed of the device, an electrical waveform applied to micro-heaters tuning the resonators is modified. In one embodiment an overshoot electrical waveform is applied to the first resonator to increase heating and an undershoot electrical waveform is applied to the second resonator to reduce heating in order to get to the final required temperature quicker. For example, the overshoot may be an increase in drive voltage for one microsecond to a higher value than a final value to provide increased heating quickly.

It is another object of the invention to provide an improved heatsinking by adding conductive element on top of the device to achieve improved thermal conduction and a shorter time constant and faster tuning.

In one embodiment, the improved heatsinking is realized by adding gold traces on top of the device to improve lateral thermal conduction from a microresonator to the substrate which results in reduction of the cooling time-constant and faster device operation.

It is another object of the present invention to provide an improved control of the resonators and achieve improved device response with less strict requirements to the resonator's characteristics to be identical. The device comprises N first loop resonators forming a first super-ring controlled by a first bias voltage, (N≧1), and N second loop resonators forming a second super-ring controlled by a second bias voltage, the first and the second bias voltages shifting a center frequency of each group of resonators while a shape of a group response stays constant. The time delay tuning is performed by a balanced thermal approach, which includes simultaneous thermal tuning up and down the first and second super-rings respectively. The difference in resonant frequencies of the resonators within each super-rings may be up to 2%.

Yet another object of the present invention is a method of producing an optical signal delay, the method comprising introducing an input optical signal having multiple frequencies in a waveguide, coupling the optical signal to a first loop resonator; coupling a light beam outputted by the first resonator to a second loop resonator; outputting a delayed optical signal, wherein all frequencies of the input optical signal have the same group delay. In one embodiment the first and the second loop resonators have the resonant angular frequencies $\omega_1=\omega_0+\Delta\omega$ and $\omega_2=\omega_0-\Delta\omega$ respectively, where $\omega_0$ is a median frequency of the input optical signal. The method also comprises the time delay tuning performed by a balanced thermal approach, which includes simultaneous thermal tuning up and down the first and second resonator respectively.

DETAILED DESCRIPTION OF THE PREFERRED EMBODIMENT

Optical delay lines typically use near infrared (NIR) light, however the disclosure is not limited to this spectral range. The term "optical" in the present disclosure comprises visible, near infrared, infrared, far infrared and the near and far ultra-violet spectra.

Figure 1:
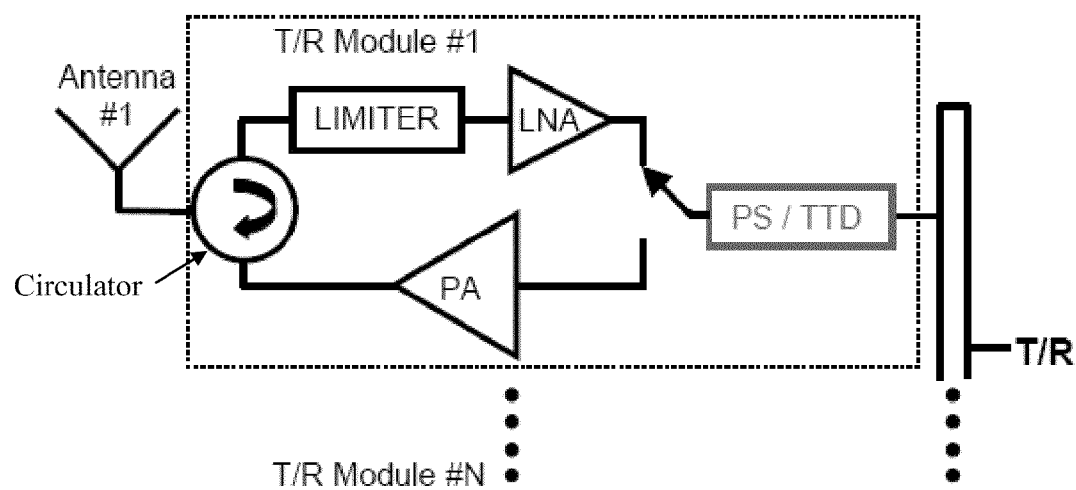
FIG. 1 A schematic of a transmitter/receiver module having an active phased array system with true time delay unit.
Figure 2:
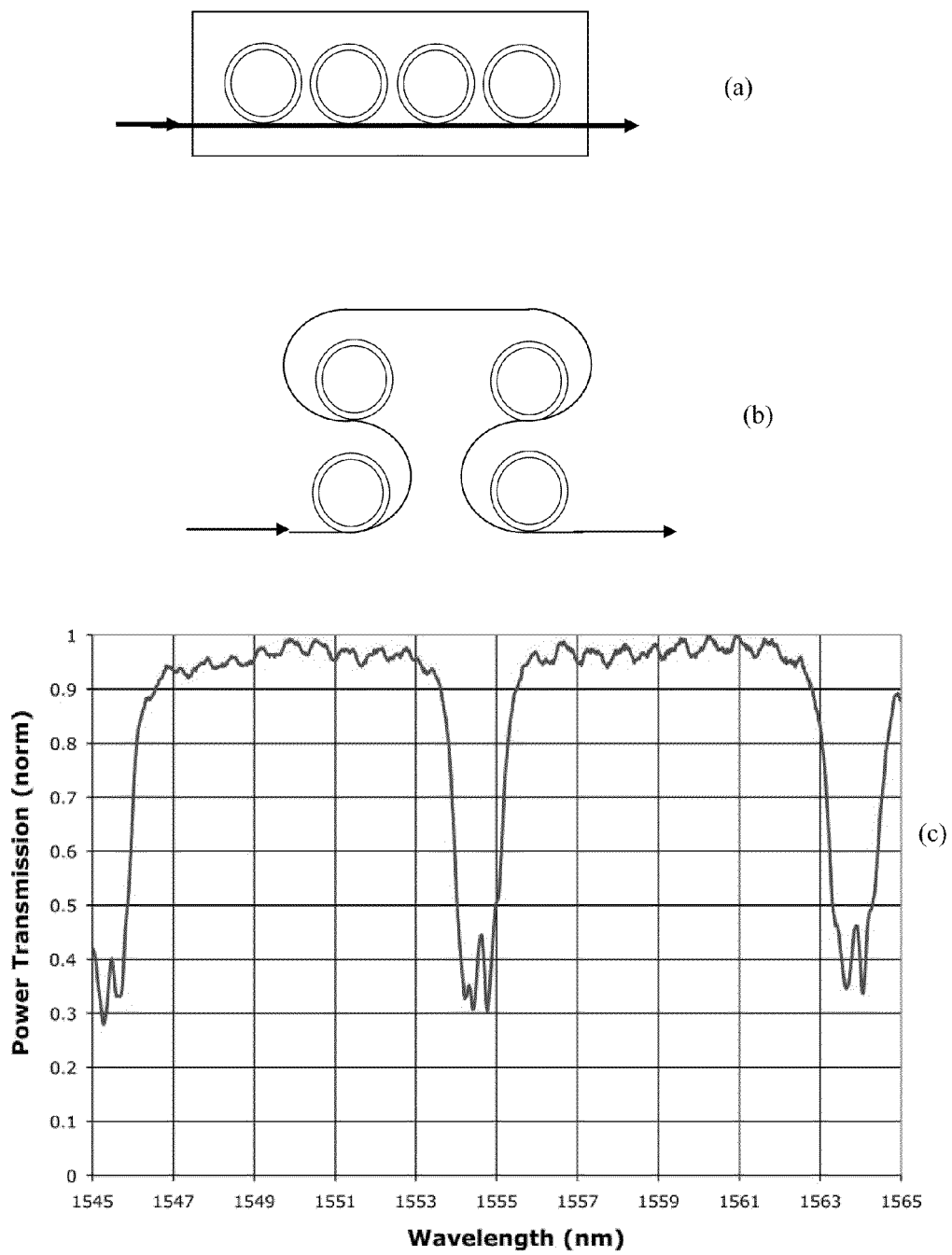
FIG. 2. (a) A 'side-coupled integrated spaced sequence of resonators' (SCISSOR) structure; (b) a SCISSOR structure with the resonators coupling on the opposite sides of the core waveguide (prior art); (c) measured transmission spectrum for 10 microresonators, showing a combined spectral dip ~1.2 nm from the combination of the 10 microresonator dips, and a free-spectral-range of ~9.5 nm. Each individual microresonator dip is ~0.3 nm wide.

The prior art shows that the phase shift in the SCISSOR delay line (shown in FIG. 2 (*a*)) with N rings each having a round-trip time τ can be written as tan $$\left(\frac{\Phi}{N}\right) = \frac{\kappa^2 \sin(\omega - \omega_r)\tau}{(1+\rho^2)\cos(\omega - \omega_r)\tau - 2\rho} \quad (1)$$

where the resonant frequency is $\omega_r = 2m\pi\tau^{-1}$ and τ is around trip time, and the coupling between the resonator and waveguide is $\kappa = \sqrt{1-\rho^2}$ The group delay can then be written as $$T_d(\omega) = \frac{\partial \Phi(\omega)}{\partial \omega} = N\tau \frac{1+\rho}{1-\rho} - N\tau^3 \frac{(1+\rho)\rho}{(1-\rho)^3}(\omega - \omega_r)^2 + \quad (2)$$

$$\frac{1}{12} N\tau^5 \frac{(1+\rho)\rho(1+10\rho+\rho^2)}{(1-\rho)^5}(\omega - \omega_r)^4 + \ldots ==$$

$$T_{d0} - N\beta_3(\omega - \omega_r)^2 + N\beta_5(\omega - \omega_r)^4 + \ldots$$

where we have introduced higher order group delay dispersion (GDD) terms $\beta_3$ and $\beta_5$. It is these terms that are responsible for the different delay experienced by different frequency components of the signal.

By adjusting the phase of the received signal by means of tunable delays, the sensitivity, directional gain and other aspects of the RF antenna can be controllably varied.

The present invention addresses tenability and the bandwidth expansion of SCISSOR not achievable in the prior art design.

Figure 3:
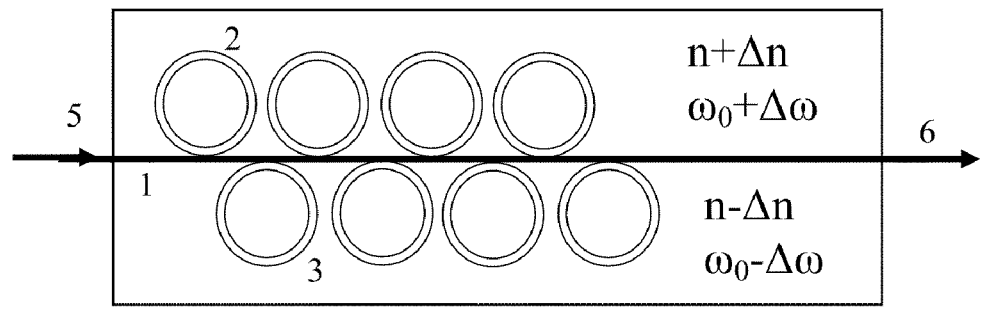
FIG. 3 A tunable delay based on two sets of microresonators.

The novel delay line structure is shown in FIG. 3, where the resonant frequencies of rings are shifted by a small amount $\Delta\omega$ relative to $\omega_0$ (central frequency of the signal) i.e. $\omega_{1,2}=\omega_0\pm\Delta\omega$ This can be accomplished by changing the effective refractive index on the two sides of the central bus. An input optical signal is introduced in the waveguide 1 and coupled in and out the first resonator 2 having an angular resonant frequency $\omega_1$. The output signal from the first resonator then coupled in and out of the second resonator 3 with an angular resonant frequency $\omega_2$. In the preferred embodiment the device has more than one pair of resonators with $\omega_1$ and $\omega_2$. One set of resonators (shown on one side of the waveguide) have angular resonant frequency $\omega_1$, while another set of resonators (shown on the opposite side of the waveguide) have angular resonant frequency $\omega_2$. Each set may contain tens of the resonators. When the input optical signal 5 is a complex signal having multiple frequency components, this device provides an equal group delay to all frequency components in the output signal 6. This is achieved by eliminating a third order group delay dispersion over all frequencies of the input optical signal using cancellation of a positive dispersion of the first loop resonator by a negative dispersion of equal magnitude of the second loop resonator.

The different resonant angular frequencies $\omega_1$ and $\omega_2$ may be achieved by different perimeters of the first and second resonators or by different effective refractive indices of the resonator waveguides. The resonator loop can be of any shape: ring, rectangular, etc.

Figure 4:
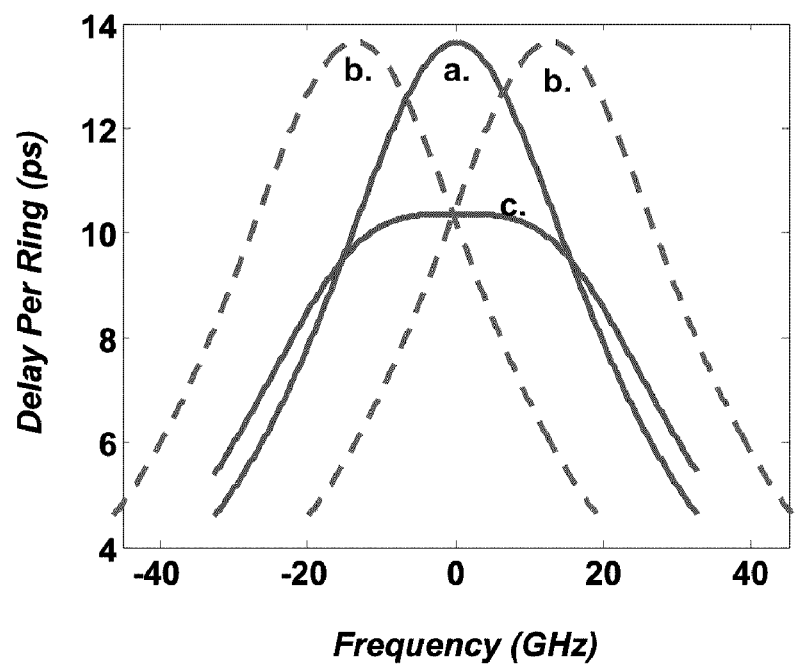
FIG. 4 Group delay spectra of the microresonators with
a. given resonance frequency $\omega_0$;
b. resonance frequency shifted by ±13 GHz;
c. two combined shifted microresonators.

FIG. 4 shows the spectra of $T_{d1}(\omega)$—group delay per one ring for the structure with identical rings (curve a), the two shifted spectra $T_{d1}(\omega\pm\Delta\omega)$ for the "upper and lower rings" drawn by dashed lines and the resulting average curve $\overline{T}_{d1}=T_{d1}(\omega+\Delta\omega)/2+T_{d1}(\omega-\Delta\omega)/2$ which appears significantly flattened. This flattened curve provides a wider bandwidth of operation than previous designs. As an example, we use the rings with round trip time τ=0.22 ps and κ=0.25. The detuning $\Delta\nu=(2\pi)^{-1}\Delta\omega$ in FIG. 4 was taken to be 13 GHz. Changing $\Delta\omega$ will affect both magnitude of group delay and its spectral width, thus providing a way for tunability, but with certain bandwidth restrictions.

The analytical estimation of the system performance uses an expression for the group delay in the "shifted" SCISSOR with power series approach applied.

The expression for the group delay is the following $$T_d(\omega) = T_{d0} - \frac{N}{2}\beta_3^{(1)}(\omega - \omega_0 - \Delta\omega)^2 - \frac{N}{2}\beta_3^{(2)}(\omega - \omega_r + \Delta\omega)^2 + \quad (3)$$

$$\frac{N}{2}\beta_5^{(1)}(\omega - \omega_0 - \Delta\omega)^4 + \frac{N}{2}\beta_5^{(2)}(\omega - \omega_0 + \Delta\omega)^4 \ldots \approx \approx$$

$$T_{d0} - N\beta_3\Delta\omega^2 + N\beta_5\Delta\omega^4 - N[\beta_3 - 6\beta_5\Delta\omega^2](\omega - \omega_r)^2 +$$

$$N[\beta_5 - 15\beta_7\Delta\omega^2](\omega - \omega_0)^4$$

Now, if the condition $$\Delta\omega_0^2 = \frac{\beta_3}{6\beta_5} = \frac{2(1-\rho)^2}{(1+10\rho+\rho^2)}\tau^{-2} \approx \frac{(1-\rho)^2}{6}\tau^{-2} \quad (4)$$

is satisfied, the third order dispersion is eliminated, and a following expression is obtained for the delay time $$T_d(\omega_0) = T_{d0} - \frac{5}{6}N\beta_3\Delta\omega_0^2 + N\beta_5'(\omega - \omega_r)^4 = \quad (5)$$

$$T_{d0} - \frac{5}{3}\frac{\rho}{1+10\rho+\rho^2}T_{d0} + N\beta_5'(\omega - \omega_r)^4 \approx \frac{31}{36}T_{d0} + N\beta_5'(\omega - \omega_r)^4$$

which is only about 15% less than the delay in the simple SCISSOR. Note that the delay spectrum curve of FIG. 4.c becomes flattened.

The important result is the fact that by changing $\Delta\omega$ in the vicinity of $\Delta\omega_0$ one can achieve a tunable delay. By differentiating (3) with respect to detuning $\Delta\omega$ one obtains $$\frac{dT_d}{d\Delta\omega}\bigg|_{\Delta\omega_0} = -2N\Delta\omega[\beta_3 - 2N\beta_5\Delta\omega^2]_{\Delta\omega_0} = \quad (6)$$

$$-\frac{4}{3}N\beta_3\Delta\omega_0 = -\frac{4}{3\sqrt{6}}N\tau^2\frac{(1+\rho)\rho}{(1-\rho)^2} = -\frac{4}{3\sqrt{6}}T_d\frac{\rho\tau}{1-\rho}$$

The expression for the resonant frequency change $\Delta\omega$ as a function of refractive index change $\Delta n$ that causes this change is the following $$\Delta\omega = f\omega_r\Delta n/n \quad (7)$$

Where f is the effective fraction of circumference in which the refractive index actually can get changed. Thus the time delay is $$\Delta T_d = -\frac{4}{3\sqrt{6}}T_d\frac{\rho f\omega_r\tau}{1-\rho}\frac{\Delta n}{n} = -\frac{8\pi}{3\sqrt{6}}\frac{\rho}{1-\rho}\frac{fL\Delta n}{\lambda_0}T_d \quad (8)$$

Figure 5:
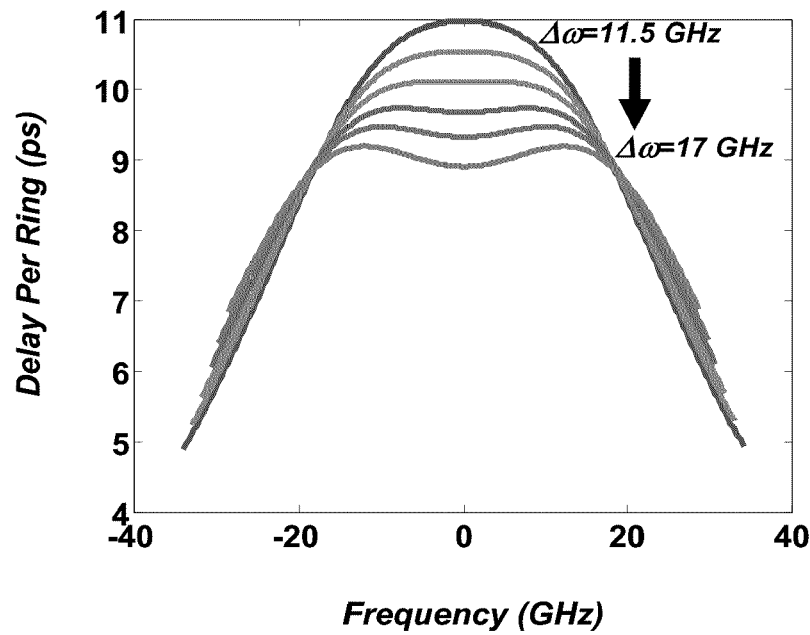
FIG. 5 Group delay spectra of "compensated shifted resonator" delay line for different amounts of detuning.

Changing refractive index by 0.1% changes the delay by 50%. FIG. 5 presents the result of numerical modeling of the same structure with κ=0.25 and the detuning varying from 11.5 GHz to 17 GHz.

Figure 6:
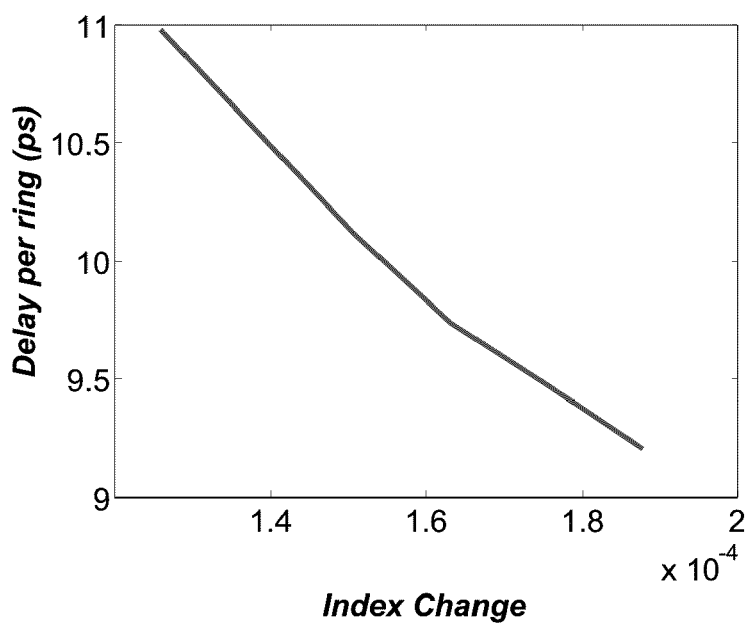
FIG. 6 A delay per ring as a function of index change.

A tunability of about 2 ps per ring can be achieved as the shape of group delay spectra changes. In fact the "camelback spectra" achieved with larger detuning may be better for a double-sideband modulated signal than the flatter curve attained with optimum detuning. The value of maximum group delay as a function of index change (for the effective index of about 2.2) is shown in FIG. 6.

Figure 7:
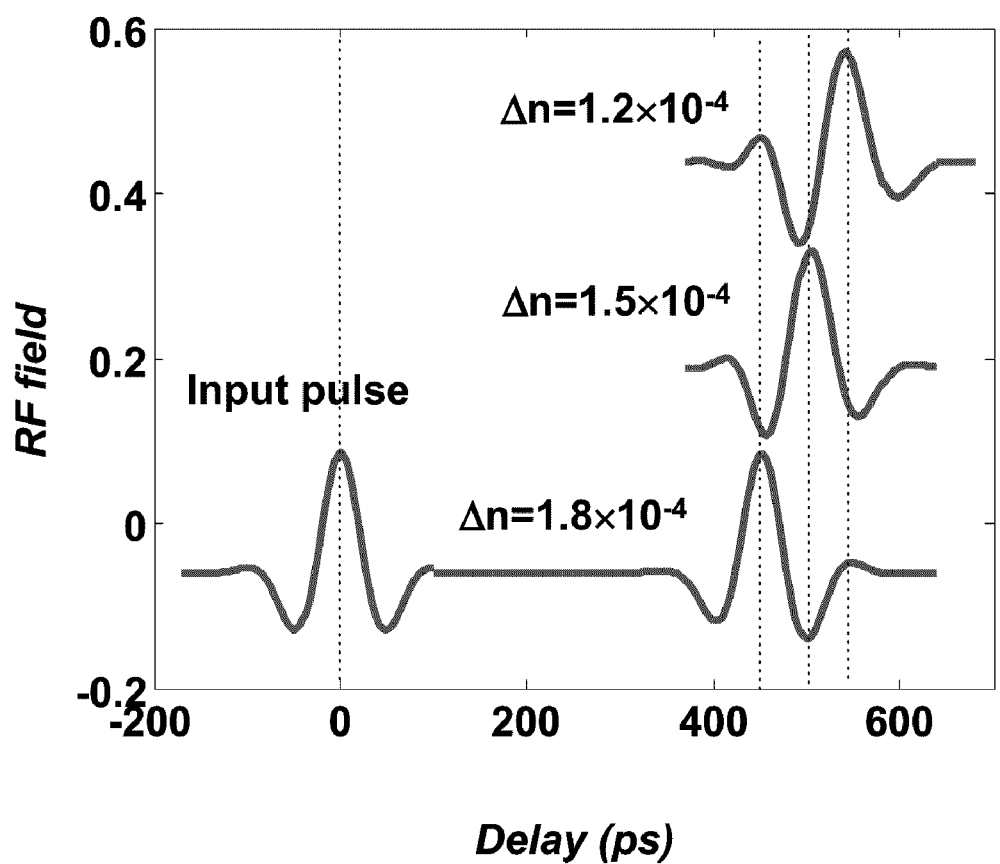
FIG. 7 A tunable delay of RF pulses using compensated shifted microresonator with 50 rings.

The results are consistent with the rough estimate obtained before—a reasonably small (less than $10^{-3}$) change in refractive index can accomplish fairly large fractional change in the delay time. Therefore, it appears that the main limitation is not the limited ability to change index but still the dispersion of group delay. Its impact can be estimated as follows:

FIG. 7 shows the evolution of a 100 ps pulse through the delay line of FIG. 3 consisting of N=50 rings for different values of the refractive index change. The results show that one can achieve delays of about 100 ps (from 450 to 550 ps) which is more that sufficient to achieve full 180 degrees rotation in a phased array antenna designed with a central frequency of 8.8 GHz. One can see that GDD plays an important role even in the compensated scheme but note that the total (fixed) delay exceeds the one in the uncompensated scheme by a factor of 5 or so.

A variety of technologies could be used for the tunable delay fabrication. In the preferred embodiment an active device is provided including a silicon substrate, an insulator layer, and a top silicon layer, in which the device is fabricated. The device is electronically controlled by injected carriers or by applying an electric field. For this, the loops are made from a semiconductor, such as Si with lower layer being n-doped, upper layer p-doped and the layer in between undoped. When a forward bias (+ to the top layer) is applied, carriers (electrons and holes) are injected into the undoped region and they increase the effective refractive index of the material, causing the change of the angular resonant frequency.

In another embodiment the resonator angular frequency is tuned using the quantum confined Stark effect. For this, the loops are made from direct-bandgap semiconductor quantum wells, such as GaAs, with the lower layer being n-doped, the upper layer p-doped and the layer in between undoped. When a reverse bias (to the top layer) is applied, the applied field increases the effective refractive index, causing a change of the angular resonant frequency.

The resonant angular frequencies $\omega_1$ and $\omega_2$ may be tunable within a range of +/−0.1% within 10 microseconds using these technologies.

In a different embodiment another (slower) technology is used, which includes silica waveguides on a silicon wafer. These devices use thermal tuning by applying a heater on the resonator or waveguide structure to change the refractive index. "Hydex" material, produced by Infinera, Calif. can be used for this kind of thermally tuned device; this material has a refractive index between that of silicon and silica. Devices could also be fabricated in III-V compound semiconductors, such as InP or GaAs.

Figure 8:
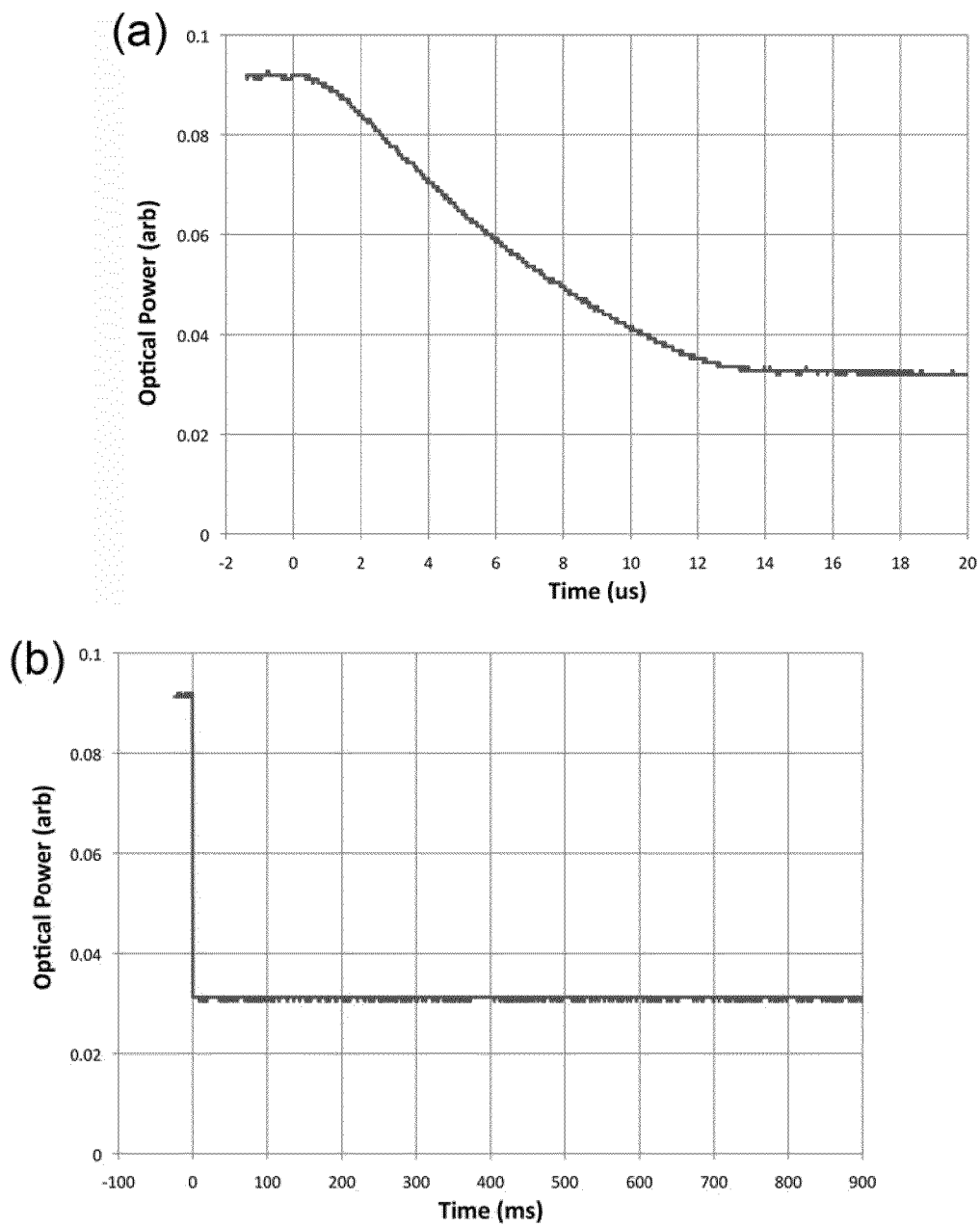
FIG. 8 A transient tuning measurement showing the change in output power versus time (proportional to delay versus time) with a fast tuning transient, shown on a short timescale of 20 microseconds (a) and on a long timescale of 900 milliseconds (b).

One key advantage of the present invention is that it uses a balanced approach, in that one set of microresonators is tuned up in frequency while at the same time the other set is tuned down in frequency by the same amount. When using thermal tuning to achieve the changes in microresonator frequency, this provides a balanced thermal approach, in which heat is added to one set of microresonators while at the same time the same amount of heat is removed from the other set of microresonators. In this way the total heat provided to the device remains constant, and therefore any potential effects on the device performance due to longer time constants are totally eliminated. The elimination of longer time constants, associated with the thermal time constant of the full device, the mount, heatsink and temperature control electronics are eliminated using this balanced thermal approach, which has been validated by measurements of the transient fast tuning of devices using the present invention, as shown in FIG. 8. This idea works for any thermal driven device where the operation can be achieved with such a 'balanced' scheme; increasing heating to some of the elements while decreasing to the others, keeping the total heating constant.

Figure 9:
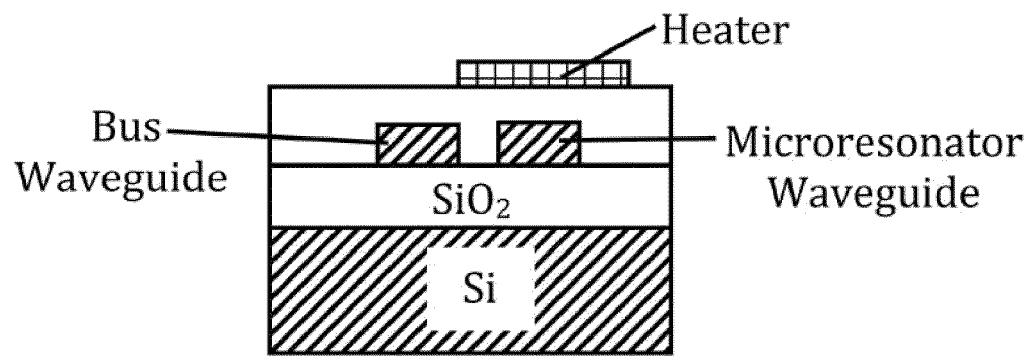
FIG. 9 A microresonator structure with a micro-heater placed directly on top of the SiO2 layer which covers the microresonator ring.
Figure 10:
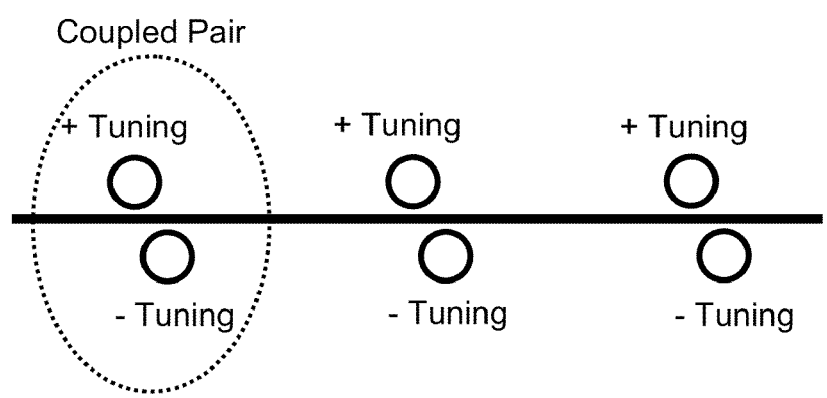
FIG. 10 Two microresonators positioned close together to form a coupled thermal pair.

There is a need to produce fast tuning of the device, aiming for 'microsecond tuning times', e.g. less than ten microseconds. Different approaches are proposed to improve the tuning time:

1) To achieve fast tuning speeds in the microsecond range, consider an implementation of the device with micro-heaters placed very close on top of the microresonator rings, as shown in FIG. 9. The close positioning of the micro-heaters next to the microresonators provides extremely fast tuning, however, the balanced thermal approach only provides an overall neutral thermal effect when the increased heating from one microresonator is balanced by the reduced heating from another microresonator. In order to reduce the time taken for this to occur, it is proposed that pairs of microresonators are placed very close together so that they operate as a coupled pair: one is thermally tuned up, the other down, so the overall thermal effect is neutral. By having the two microresonators very close to each other, as shown in FIG. 10, the thermal time constant becomes smaller as the temperature changes become more localized to the two rings.

2) Electrical pre-emphasis: in this approach, the electrical waveform to the micro-heaters is modified in order to increase the tuning speed of the device. In the non pre-emphasis case, the drive voltage to the micro-heater is changed from one value to another to provide the required tuning. The first pre-emphasis approach is to provide an overshoot (undershoot) to increase heating (reduce heating) to the microresonators in order to get to the final required temperature quicker. Such an overshoot may be an increase in drive voltage for one microsecond to a higher value than the final value to provide increased heating quickly, or conversely, the drive voltage may be reduced to a lower value that the final value in order to provide reduced heating quickly. The maximum undershoot that can be obtained is by turning the driver voltages to zero, which would be balanced by an associated increase in heat delivered to the other microresonators. An extension of this relatively simple undershoot/overshoot pre-emphasis approach is to generate a more complex electrical drive waveform designed so that the microresonators achieve their final temperatures in the quickest time, therefore maximizing tuning speed.

3) Another approach is associated with the microresonator design itself. Reducing the thickness of insulating layers in the device as much as possible without adversely affecting the delay performance allows thermal equilibrium to occur more quickly, e.g. using a thinner SiO2 layer, or removing the SiO2 layer where it is not needed.

4) Another approach is to improve the heatsinking of the microresonators to reduce the cooling time-constant, which can, depending on the design, be slower than the heating time-constant. Heatsinking can be improved by adding gold traces on top of the device to improve thermal conduction from a microresonator (laterally) to the substrate and also improve thermal conduction between microresonators, therefore reducing the thermal time constant of the device. Another way to improve heatsinking is to add a conductive element (e.g. another substrate) on top of the device (e.g. flip chip) to provide improved thermal conduction and therefore a shorter time constant and faster tuning. The downside of these approaches is that they will increase the necessary heating power to obtain a specific temperature on the microresonator, so there is a tradeoff between tuning speed and device power dissipation.

It is another object of the present invention to provide a method for producing an optical signal delay. The method comprises introducing an input optical signal having multiple frequencies in a waveguide, coupling the optical signal to a first loop resonator; then coupling the optical signal outputted by the first resonator to a second loop resonator; outputting a delayed optical signal, wherein all frequencies of the input optical signal have the same group delay. The first and the second loop resonator have different angular resonant frequencies as shown in FIG. 3. These resonant angular frequencies $\omega_1$ and $\omega_2$ may be tuned by the same value $\Delta\omega$ thus tuning the group delay of the output optical signal.

In the preferred embodiment of the present invention, a series of ring resonators is used in the device design. However, the invention is not limited to such configuration. Other embodiments include all variety of resonator types. The invention addresses an assembly of one or more pairs of tunable resonators or filters (or just responses), which when combined together provide the required overall tuning response, that is, a broad range of tenability of the overall group delay (time delay) with limited distortion. The resonators/filters are tuned in opposite directions (in wavelength) so that the combined group delay at the center wavelength between the two resonators/filters is tuned up or down as the responses move away from or towards each other. This approach is applicable to any types of resonators or filters than can be combined (amplitude and phase responses) to give the desired response, which includes micro-ring resonators, Bragg gratings, photonic crystals, free space resonators or some other form of optical resonator or filter of some sort. The device does not need to be flat, and it can also be in 3D—some resonators are spherical, and any kind of 2D or 3D structure could potentially be used. The refractive index is changed in one implementation, but it is also possible to change the coupling coefficient to tune the rings through a physical mechanical movement using MEMS. In another embodiment, the refractive index is kept unchanged while the device is tuned by changing its size.

In order to utilize the present invention it is necessary to align all of the microresonators to the same optical frequency for the zero detuning case, which would optimally occur when the same bias is applied to each microresonator—if all microresonators are identical and have the same resonance frequency and tuning characteristics, they will align at the same optical frequency for the same bias. For the current invention, one set of microresonators would be connected together and their bias set by a single control, e.g. voltage, allowing them to be tuned together down in frequency, while the other set of microresonators would be connected together and controlled by another single voltage, allowing them to be tuned together up in frequency. This approach requires only two voltages to control the delay for any number of microresonators. If the microresonators are not identical, and each has its own resonance frequency, as shown in the optical transmission spectrum in FIG. 2(c), then the resultant spectrum when all microresonators are biased at the same value will be wider than that of a single microresonator, and will have random variations due to the addition of responses from each of the resonators to create the overall response. In this case each of the microresonators will require its own bias voltage in order to provide the correct bias to set the microresonator to the correct frequency. For a device with 20 microresonators this would require 20 voltages, or it may be possible to reduce that number by combining together microresonators with the same resonant frequency, to reduce the overall number of voltages required.

In order to overcome the problem of non-uniformity in microresonator resonance frequency, requiring individual control of the bias of each resonator, to enable the current invention to be applied with two bias voltages, we propose that the microresonators on a device are split into two separate groups, referred to as 'super-rings', which are addressed by two bias voltages, and that the number of microresonators in each super-ring is increased to the point where the shape of the combined response of a super-ring follows the distribution shape of resonance frequency for those microresonators. This depends on both the distribution width (e.g. a normal distribution for the variation in resonance frequency of different microresonators on a device, due to e.g. processing variations in device fabrication) compared to the width of the microresonator resonance shape, and the number of microresonators. By first minimizing the distribution of the resonance frequencies of microresonators on a single device, through e.g. tighter processing controls, and then increasing the number of microresonators on the device, it is possible to provide a device where the response of each super-ring has a defined shape (from the distribution shape and the individual microresonator response). The two super-rings can then be controlled by two voltages, which will shift the center frequency of each super-ring while the shape of the super-ring response stays constant. In this way, the two super-rings can be used for the current invention. Additionally, because the super-ring shape has a much larger bandwidth than a single microresonator, the current invention utilizing two super-rings will also have much larger bandwidth, providing an approach to further increase the operating bandwidth of the invention.

Figure 11:
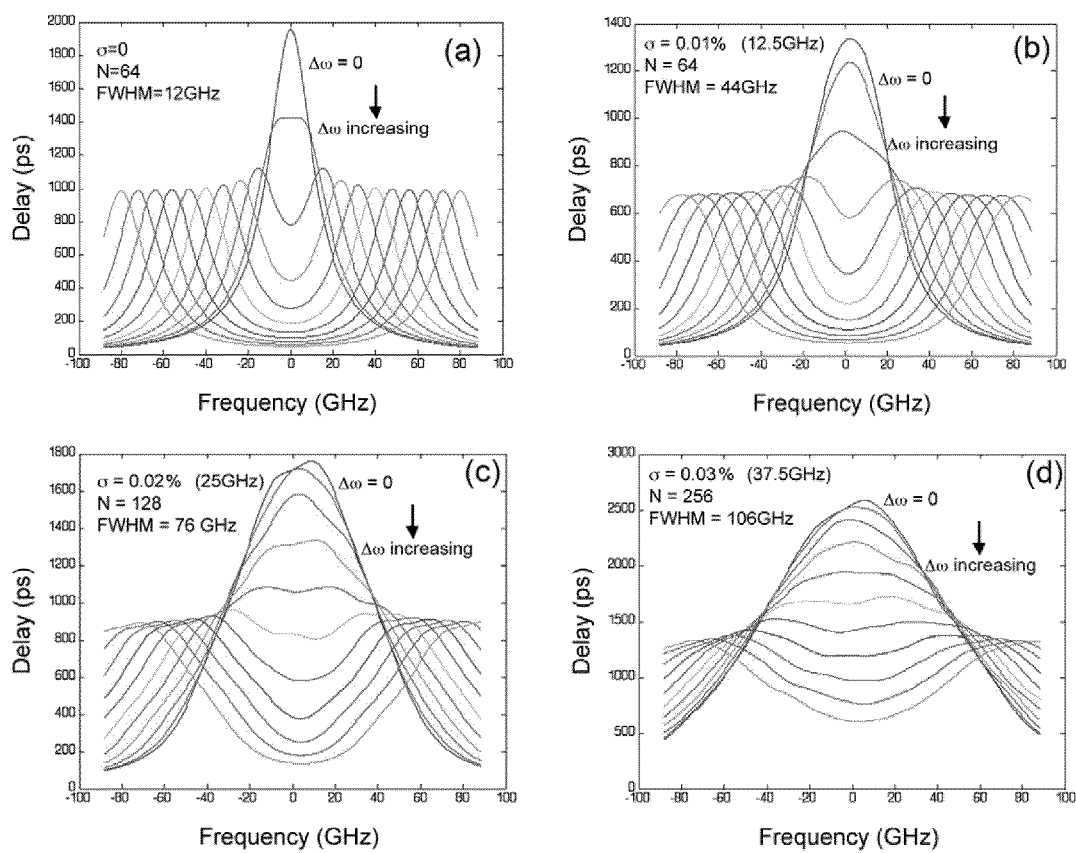
FIG. 11 Simulated responses for delay versus offset from center frequency for a) 64 microresonators with center frequency aligned, i.e. σ=0, FWHM=12 GHz, b) 64 microresonators with center frequency distributed, σ=0.01% of free spectral range (FSR)=12.5 GHz, FWHM=44 GHz, c) 128 microresonators with center frequency distributed, σ=0.02% FSR=25 GHz, FWHM=76 GHz, d) 256 microresonators with center frequency distributed, σ=0.03% FSR=37.5 GHz, FWHM=106 GHz.

Simulations were carried out to validate the use of super-rings to overcome the non-uniformity of microresonator resonance frequency and allow the current invention to be used with only two drive voltages. FIG. 11 (a) shows the response of the current invention for 64 microresonators whose resonance frequencies are all aligned—the reference case, where the normal distribution sigma is 0. The plot shows the combined response of the 64 microresonators; the central curve with the maximum delay at 0 GHz corresponds to a detuning of 0 GHz, the other traces correspond to detuning values increasing from 8 GHz to 80 GHz in steps of 8 GHz. The FWHM of the central curve is 12 GHz, which is the FWHM of each individual microresonator in this simulation. Using the current invention, varying the detuning from 0 GHz to 80 GHz, the delay is varied from a maximum of almost 2000 ps to a minimum of ~30 ps. FIG. 11(b) shows the same simulation, however, in this case the resonance frequencies of the microresonators are spread around 0 GHz using a normal distribution, with the sigma equal to 0.01% of the free spectral range, which is 12.5 GHz. The central response curve is significantly broader than the case for sigma=0, having a FWHM of 44 GHz. The delay changes as the detuning is increased using to the current invention, however, the total delay is reduced due to the spreading of the microresonator resonance frequencies, while the bandwidth of the response is increased, also due to the spreading of the microresonator resonance frequencies. This approach therefore provides a tradeoff between maximum delay and the bandwidth of the delay. The plots in FIG. 11(c),d show similar simulations but for a larger number of microresonators (128 and 256) and for a larger sigma (0.02% FSR:25 GHz, and 0.03% FSR:37.5 GHz). In FIG. 11 (c) the central response FWHM is 76 GHz, while in FIG. 11 (d) the central response FWHM is 106 GHz, and both plots show the inherent increase in bandwidth from this approach that is obtained as the sigma increases. As the sigma is increased, the number of microresonators required to provide a defined super-ring response also increases.

Figure 12:
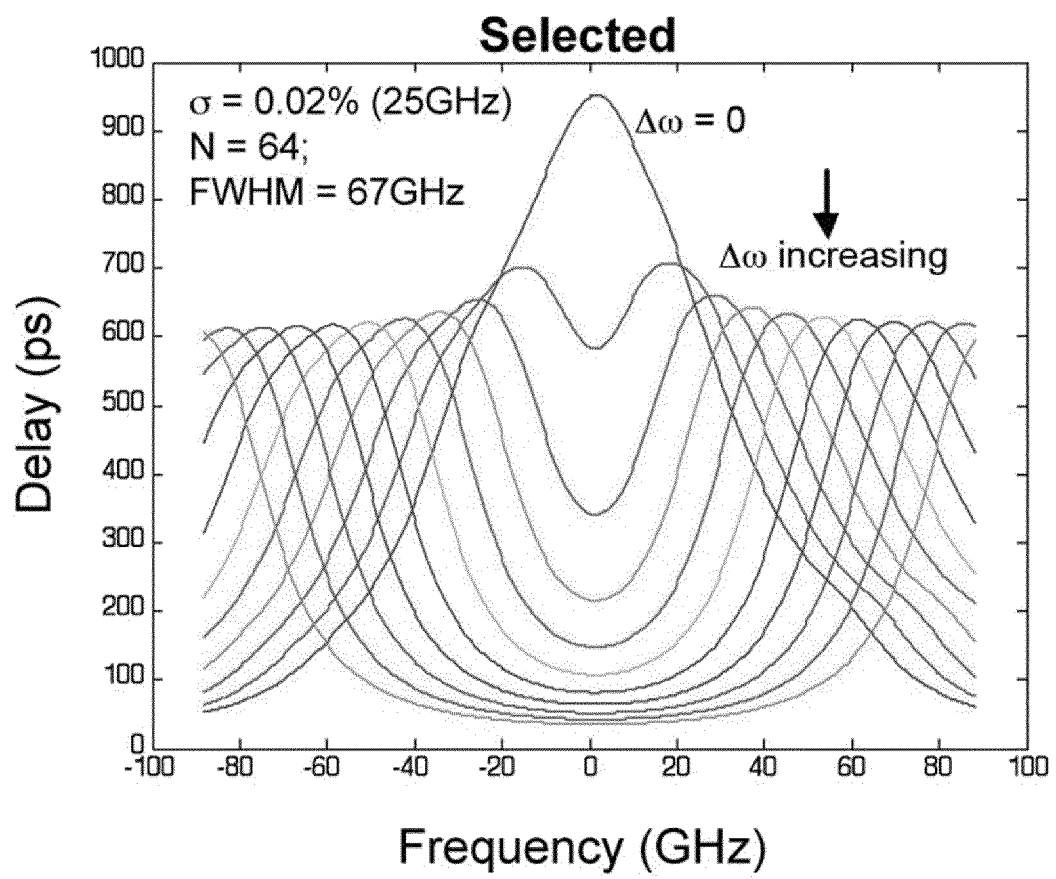
FIG. 12 Simulated responses for delay versus offset from center frequency for 64 microresonators with center frequency distributed, σ=0.02% FSR=25 GHz, FWHM=67 GHz. The microresonators are selected; the highest 32 resonance frequencies in one super-group and the lowest 32 in the other super-group.

In addition to the use of super-rings to provide a controllable response shape with only two drive voltages in the presence of non-uniformity of resonance frequency, it is possible to obtain a controllable response shape with a smaller number of microresonators and the same sigma value by selection of the two groups of microresonators making up each super-ring. In this case microresonators with higher resonance frequencies are selected for one super-ring, and microresonators with lower resonance frequencies are selected for the other super-ring. In this way the distributions of resonances in each super-ring are smaller, and so the number of rings required for a fixed sigma value is reduced. Because each super-ring is selected from a normal distribution, their response will be asymmetric, and so the bandwidth of the overall response will be narrower than the case with no selection—this is shown in FIG. 12, which uses only 64 microresonators to obtain a controllable shape response with a sigma of 0.02% (128 microresonators were used in FIG. 12 for sigma=0.02% with no selection).

While the above invention has been described with reference to specific embodiments, these embodiments are intended to be illustrative and not restrictive. The scope of the invention is indicated by the claims below, and all changes that come within the meaning and range of equivalents thereof are intended to be embraced therein.

The invention claimed is:

1. An optical device for producing a tunable time delay of an input optical signal, comprising:
   an optical waveguide receiving the input optical signal;
   at least a first loop waveguide resonator coupled to the waveguide by a first coupler, the input signal being coupled in and out of the first loop resonator;
   at least a second loop waveguide resonator being coupled to the waveguide by a second coupler; the second loop resonator receiving a signal outputted by the first loop resonator and outputting an output signal;
   the output signal being transmitted by the waveguide;
   wherein the first and the second loop resonators having different resonant angular frequencies $\omega_1$ and $\omega_2$, wherein
   the time delay tuning is performed by a balanced thermal approach, which includes simultaneous thermal tuning up and down the first and second resonator respectively.

2. The optical device of claim 1, wherein the input optical signal being a complex signal having multiple frequency components, and the device is providing an equal group delay to all frequency components in the output signal.

3. The optical device of claim 1, wherein electrical waveform applied to micro-heaters tuning the resonators is modified in order to increase the tuning speed of the device.

4. The optical device of claim 3, wherein an overshoot electrical waveform is applied to the first resonator to increase heating and an undershoot electrical waveform is applied to the second resonator to reduce heating in order to get to the final required temperature quicker.

5. The optical device of claim 4, wherein the overshoot is an increase in drive voltage for one microsecond to a higher value than a final value to provide increased heating quickly.

6. The optical device of claim 4, wherein a drive voltage is reduced to a lower value that the final value in order to provide reduced heating quickly.

7. The optical device of claim 1 with improved heatsinking by adding conductive element on top of the device to provide improved thermal conduction and a shorter time constant and faster tuning.

8. The optical device of claim 1 with improved heatsinking by adding gold traces on top of the device to improve lateral thermal conduction from a microresonator to the substrate which results in reduction of the cooling time-constant and faster device operation.

9. The optical device of claim 1, further comprising N additional first loop resonators and N additional second loop resonators (N≧1), all first loop resonators forming a first super-ring controlled by a first bias voltage, and all second loop resonators forming a second super-ring controlled by a second bias voltage, the first and the second bias voltages shifting a center frequency of each group of resonators while a shape of a group response stays constant.

10. The optical device of claim 1, wherein the group delay is up to 1000 ps.

11. The optical device of claim 1, further comprising: the resonant angular frequencies $\omega_1=\omega_0+\Delta\omega$ and $\omega_2=\omega_0-\Delta\omega$ of the loop resonators being equally distant from a frequency $\omega_0$, wherein $\omega_0$ is an input signal median frequency.

12. The optical device of claim 11, wherein the resonant angular frequencies $\omega_1$ and $\omega_2$ are tunable within a range of +/−0.1% within 10 microsecond.

13. The optical device of claim 1, wherein pairs of microresonators with $\omega_1$ and $\omega_2$ resonant frequencies are placed very close together so that they operate as a thermally coupled pair; one is thermally tuned up, the other down, a thermal time constant being reduced as the temperature changes become more localized to the two rings.

14. The optical device of claim 1, wherein insulating layers are minimized to achieve thermal equilibrium more quickly.

15. The optical device of claim 14, wherein the $SiO_2$ layer is removed, where it is not needed for insulation.

16. A method of producing an optical signal delay, the method comprising:
   introducing an input optical signal in a waveguide, the optical signal having multiple frequencies;
   coupling the optical signal to a first loop resonator having a resonant angular frequencies $\omega_1$;
   coupling a light beam outputted by the first resonator to a second loop resonator having a resonant angular frequencies $\omega_2$;
   tuning the resonant angular frequencies $\omega_1$ and $\omega_2$ by the same value resulting in tuning the group delay of the delayed optical signal, wherein the time delay tuning is performed by a balanced thermal approach, which includes simultaneous thermal tuning up and down the first and second resonator respectively; and
   outputting a delayed optical signal, wherein all frequencies of the input optical signal have the same group delay.

17. The method of claim 16, wherein the input optical signal being a complex signal having multiple frequency components, and the device is providing an equal group delay to all frequency components in the output signal.

18. The method of claim 16, wherein an overshoot electrical waveform is applied to the first resonator to increase heating and an undershoot electrical waveform is applied to the second resonator to reduce heating in order to get to the final required temperature quicker.

19. The method of claim 16, wherein the resonant angular frequencies $\omega_1 = \omega_0 + \Delta\omega$ and $\omega_2 = \omega_0 - \Delta\omega$ of the loop resonators being equally distant from the frequency $\omega_0$, and the input signal having a median frequency $\omega_0$.

20. The method of claim 16, further comprising coupling the optical signal to N additional first loop resonators and N additional second loop resonators ($N \geq 1$), all first loop resonators forming a first super-ring controlled by a first bias voltage and all second loop resonators forming a second super-ring controlled by a second bias voltage, the first and the second bias voltages shifting a center frequency of each group of resonators while a shape of a group response stays constant.

* * * * *